Feb. 26, 1924.
L. M. FOUTS
WATER SPRINKLING SYSTEM
Filed June 7, 1921
1,484,768
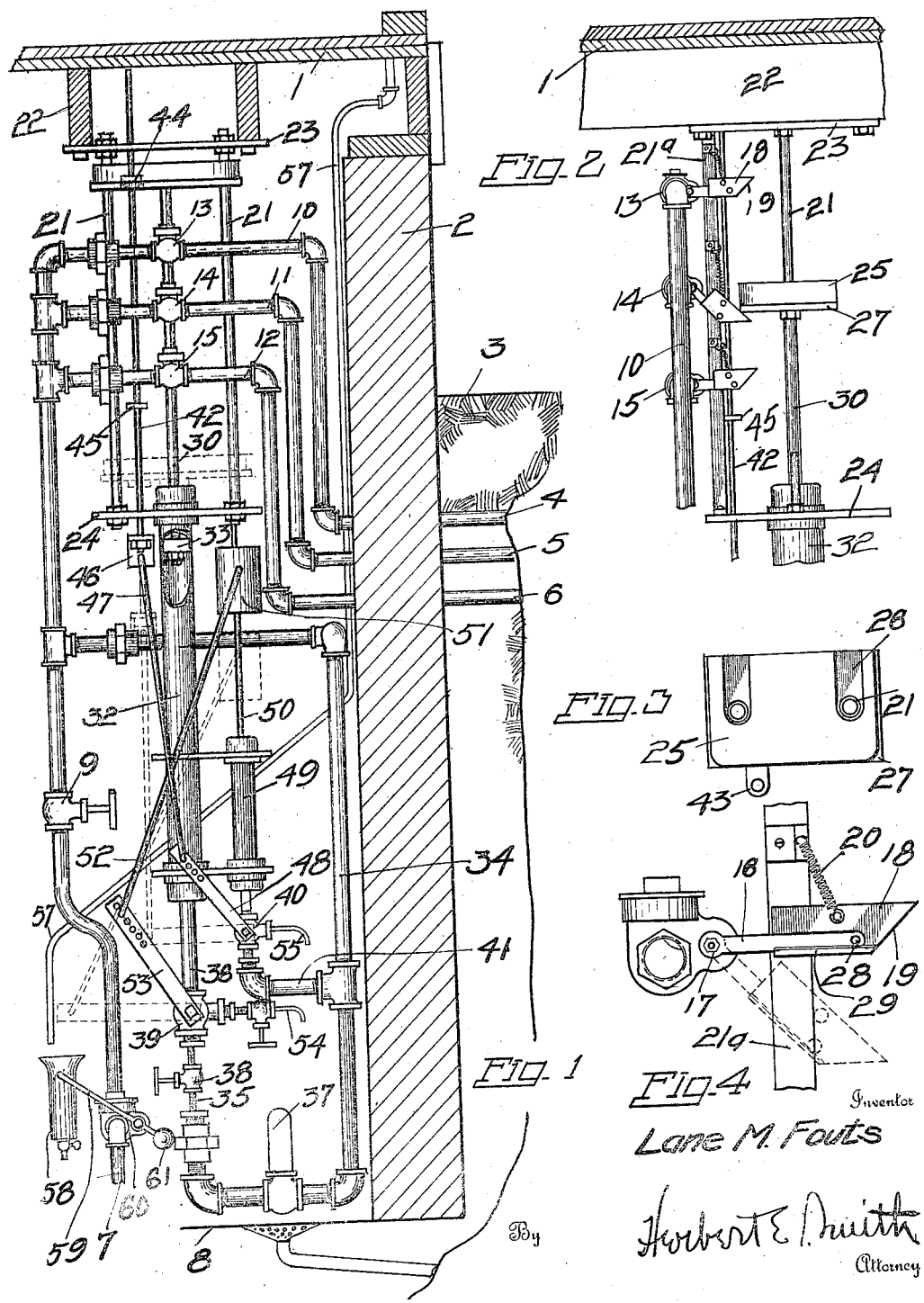
Inventor
Lane M. Fouts
By Herbert E. Smith
Attorney Patented Feb. 26, 1924.

1,484,768

UNITED STATES PATENT OFFICE.

LANE M. FOUTS, OF SPOKANE, WASHINGTON.

WATER-SPRINKLING SYSTEM.

Application filed June 7, 1921. Serial No. 475,825.

*To all whom it may concern:*

Be it known that I, LANE M. FOUTS, a citizen of the United States, residing at Spokane, in Spokane County and State of Washington, have invented certain new and useful Improvements in Water-Sprinkling Systems, of which the following is a specification.

My present invention relates to improvements in water sprinkling systems especially designed for sprinkling lawns which are equipped with underground water pipes from which the water is sprinkled or sprayed through vertical risers, and the invention contemplates particularly means actuated by valve control mechanism for permitting flow of water at periodic intervals to these sprinkling pipes. With this purpose in view the invention consists essentially in pressure actuated and gravity actuated devices for controlling the flow of water by intermittently opening control valves, which are subsequently closed by spring mechanisms, whereby the several sprinkling pipes are intermittently and automatically permitted to convey the water supply for sprinkling the lawn.

While I have specifically referred to the sprinkling of lawns as an exemplification of the use of the mechanism, it will readily be understood that the control mechanism is applicable for use in relations other than for domestic purposes.

In the accompanying drawings I have illustrated one complete example of the physical embodiment of my invention wherein pressure actuated devices including weights are employed to open the valves in connection with hydraulic lifting means for operating the weights of the mechanism and here the parts are combined and arranged according to the best mode I have thus far devised for the practical application of the principles of my invention.

Figure 1 is a view in section showing a portion of a house cellar or basement and lawn, together with the piping and actuating mechanism of my control system, the control valves for the sprinkling pipes all being in closed position.

Figure 2 is an enlarged detail elevation showing the control valves and their actuating levers, one of the levers being shown in position with the valve open and the other two closed.

Figure 3 is a top plan view of the weight, showing its guide rods in section, which successively actuates the control levers of the control valves.

Figure 4 is a further enlarged view showing the connection between the lever and control valves.

In the preferred form of the invention as shown in the drawings I have illustrated a floor portion 1 of a building or residence together with a foundation wall 2 and the surface of the adjoining ground is indicated at 3. The sprinkling pipes 4, 5, 6, are located at the proper distance beneath the surface 3 of the lawn and project through the wall 2 as shown. These pipes are equipped with vertical risers, and sprinklers or spray devices above or at the surface of the ground, and disposed at desirable and necessary intervals for properly spraying or sprinkling the entire surface of the lawn 3.

The sprinkling pipes are all supplied with water from the main pipe 7 in Figure 1 which receives its supply of water under pressure from the street main or other suitable supply not shown.

The main pipe 7 rises from the floor 8 of the cellar or basement and is provided with a usual cut-off valve 9 by means of which water may be admitted to the sprinkling system or entirely cut off therefrom when desired.

At its upper end the main pipe is fitted with elbows and branch pipes 10, 11, and 12 extending horizontally and bending downwardly for jointing with the respective sprinkling pipes 4, 5, and 6. The passage or flow of water through these branch pipes is under control of the respective valves 13, 14 and 15, said valves being normally closed, but intermittently and successively opened from the upper valve 13 to the lower valve 15, by means of control levers each of which is designated by the numeral 16, which, as seen in Figures 2 and 4 are pivoted to the valve casing at 17. As these valves and their control levers are similar in construction and operation the description of one will suffice for all.

In Figure 4 especially it will be seen that the valve lever 16 is provided with a cam arm 18 having a beveled edge or cam edge 19, and a spring 20 is connected to the cam arm and to a fixed post 21ª (Fig. 1).

These posts form part of a frame supported from the floor joists 22 in Figure 1 by plate 23, and a similar bottom plate 24 is secured by nuts on these posts or threaded bars, forming a rigid supporting frame for the operating parts of the control system.

The valves 13, 14 15 are opened successively by the downward movement of a weight 25, slotted at 26 to fit around the guide bars 21 and supported on the plate 27, the latter member being designed to contact with the top edge of the cam lever arms 18, as seen in Figure 2, where these lever arms are shown in the downward path of movement of the weight and plate. On its upward movement the weight contacts with the cam edge 19 of the arm and swings said arm on its pivot 28 to permit the weight to pass upwardly without influencing the valve. In Figure 4 it will be seen that the cam arm has a ledge or flange 29 along its lower edge which contacts with the lower edge of the lever 16, and the spring 20 serves to hold this edge of the cam arm in contact with the lever in order that the weight, cam arm and lever may co-act to open the valve.

The weight, which operates by gravity, to successively open the valves, is fixed at the upper end of a piston stem 30 which is attached by suitable means on the plate 27 and is secured thereto in proper manner. At its lower end the stem extends through the upper head of a hydraulic cylinder 32, standing erect and supported in the plate 24 of the frame, and a piston head 33 is fixed on the lower end of the stem within the cylinder. Water under pressure is conveyed to the cylinder from the supply pipe or main pipe 7 through the main branch pipe 34, reduced coupling pipe 35 and the coupling pipe 36 to the lower end of the cylinder. A pressure regulator 37 for equalizing the water pressure in the main branch pipe, and regulating valve 38 are interposed in the main branch pipe as indicated in Figure 1, for the purposes of maintaining a uniform water pressure and regulating the flow of water to the cylinder.

The water is permitted to flow into the lower end of the cylinder, beneath the piston 33 for the purpose of elevating the weight 25 and its plate, to the position indicated in Figure 1, preparatory to the opening of the control valves by the descending weight, and the admission of water pressure to the cylinder is governed by the three way valve 39 in the pipe section 36. This valve 39 of course is opened for passage of water to the cylinder for elevating the weight, but is closed against upward movement of water when the weight is descending with the piston 33 on its working stroke, and the governor valve is under control of an auxiliary valve 40 also of the three-way type and interposed in a pipe 41 branched off from the main branch pipe 34 in Figure 1. The auxiliary valve is operated from the weight 25 through the instrumentality of a tappet rod 42 supported in vertical position in the frame plates 23 and 24 in which it is adapted to reciprocate, and the rod is passed through a perforated lug 43 on the weight supporting plate 27 (see Fig. 3). The tappet rod is provided with an upper tappet 44 and a lower tappet 45, the former adapted to co-act with the lug 42 and the latter to encounter the bottom plate 24 of the frame for limiting the downward movement of the tappet rod.

At its lower end, below the plate 24 the tappet rod is provided with a flexible coupling 46 to the connecting rod 47, which in turn is flexibly connected with a valve lever 48 for turning the valve 40, and it will be apparent that as the water flows into the cylinder 32 the piston and weight are elevated in order that the plate lug may encounter and lift the tappet 44 to elevated position in Figure 1 thus closing the auxiliary control valve 40 against upward passage of water through the pipe 41.

Above the auxiliary valve is located an auxiliary cylinder 49 to which water may flow when the valve 40 is open, and the cylinder is equipped with a piston and stem 50 upon which is affixed a weight 51. The weight 51 is connected by a connecting rod 52 with valve lever 53 of the governing valve 39. Each of the three way valves 39 and 40 is equipped with a drain cock as 54 and 55, which cocks are closed against flow of water when the valves are open for upward passage of water to the respective cylinders, and each of these cocks are open to drain the cylinders when the respective valves are closed against upward flow of water to the cylinders.

The operation of the two cylinders and their connections is as follows. Assuming the parts to be in position of Figure 1, with both weights 25 and 51 elevated, the cylinders filled, and both valves 39 and 40 closed against upward flow of water. Both drain cocks 54 and 55 are open, but these cocks are of considerably reduced size compared with the capacity of their respective cylinders, in order to insure a slow drain of water from the cylinders. The open cocks permit the water from the cylinders to pass therethrough reducing the pressure in the cylinders and permitting the stems 30 and 50 and their weights 25 and 51 to descend. The descending weight 25 successively opens the control valves for the sprinkling pipes as described, and these valves are subsequently closed by their springs 20. The descending weight 51, during the period when the control valves are successively opened, turns the valve lever 53 to ultimately close the cock 54 and open the governing valve 39, and the descending weight 25 finally encounters the tappet 44 on the tappet rod 42 to swing the lever 48, open valve 40 and close the drain cock 55. The closing of the cocks and the opening of the valves 39 and 40 takes place subsequently to the opening of the valve 15 of the series of control valves, and thus the cylinders are automatically filled again with water, the weights are lifted to elevated position, and the opening of the sprinkling valves again performed as described. In this manner the sprinkling valves are periodically opened and closed as long as the cut off valve 9 is open for passage of water to the operating parts of the system, the waste water from the drain cocks passing off through a drain 56 in the floor of the basement or cellar.

Provision is made for suspension of the sprinkling system during rainfall by providing a down spout or pipe 57 from the roof of the building to carry rain water to a container 58 suspended at the end of a valve rod 59 of the valve 60 in the supply pipe. This valve is normally open, but it will be apparent that during a copious rainfall the container will be filled with rainwater, and when filled is of sufficient weight to close the valve 60. A slow drain cock 61 at the bottom of the container or bucket 58, when opened will permit the water to drain slowly from the bucket, and as the weight of the bucket is reduced a counterbalancing weight 61 on the end of the valve rod or lever 59 gradually swings the valve lever to position of Figure 1 to again open the emergency valve 60. As long as the rain-fall continues the bucket will be maintained by its weight of water in lowered position, and after the rainfall ceases the bucket is gradually emptied restoring the control system to operative condition.

The combined use of the main cylinder and auxiliary cylinder and their connections insures a constant and uniform operation of the control system, and the parts are timed and arranged in order that the operation of the valve 40 and cylinder 49 may be initiated slightly in advance of the action of the main cylinder and valve 39 to insure actuation of the main cylinder and its connections at the end of the working stroke of the weighted plate 31.

Having thus fully described my invention, what I claim and desire to secure by Letters Patent is—

1. The combination in a water distributing system including distributing pipes each having a control valve, of means for successively opening said control valves, and independent means for subsequently closing them, hydraulic means for operating said valve opening means, and means under pressure for governing said hydraulic means.

2. The combination with water distributing pipes each having a normally closed control valve, a control lever for each valve, a pivoted cam arm on each lever, and a spring for holding said each valve in normal position, of a pressure actuated reciprocable member for successively engaging said cam arms on its working stroke for opening said control valves, and means for returning said member to operative position after each working stroke.

3. The combination with water distributing pipes and control valves therefor, of a periodic valve actuating mechanism comprising a hydraulic cylinder, piston and stem and a weight on the stem adapted to co-act with said valves, a water supply pipe and a governor valve for filling said cylinder and lifting the weight, and means influenced by said weight for opening and closing said governor valve.

4. The combination in a water distributing system including control valves, of periodic valve actuating mechanism comprising a hydraulic cylinder, piston and stem and a valve actuating weight on said stem, a water supply pipe and a governor valve for said cylinder, mechanism for opening and closing said governor valve, and pressure actuated means for operating said governor valve mechanism.

5. The combination in a water distributing system including control valves, of a periodic valve actuating mechanism comprising a hydraulic cylinder, piston, stem and weight on said stem, a governor valve for said cylinder, an auxiliary hydraulic cylinder, piston, stem and weight on the stem and an auxiliary governor valve, means actuated by the first weight for operating the second auxiliary governor valve, and means actuated by the second weight for operating the first governor valve.

In testimony whereof I affix my signature.

LANE M. FOUTS.